United States Patent [19]
Dussinger

[11] Patent Number: 6,014,521
[45] Date of Patent: Jan. 11, 2000

[54] ONE-TIME-USE CAMERA WITH CLOSING MECHANISM TO CLOSE CASSETTE DISABLED WHEN UNEXPOSED FILM PREWOUND FROM CASSETTE DURING CAMERA MANUFACTURE

[75] Inventor: Thomas E. Dussinger, Henrietta, N.Y.

[73] Assignee: Eastman Kodak Company, Rochester, N.Y.

[21] Appl. No.: 09/246,316

[22] Filed: Feb. 8, 1999

[51] Int. Cl.[7] ................................................ G03B 17/24
[52] U.S. Cl. .............................................. 396/6; 396/538
[58] Field of Search ................................ 396/6, 513, 515, 396/538, 388

[56] References Cited

U.S. PATENT DOCUMENTS

| | | |
|---|---|---|
| 5,550,608 | 8/1996 | Smart et al. . |
| 5,555,063 | 9/1996 | Balling . |
| 5,579,070 | 11/1996 | Smart et al. . |
| 5,600,395 | 2/1997 | Balling et al. . |
| 5,602,609 | 2/1997 | Balling . |
| 5,608,480 | 3/1997 | Smart et al. . |
| 5,614,976 | 3/1997 | Smart et al. . |
| 5,617,169 | 4/1997 | Takaba et al. . |
| 5,629,750 | 5/1997 | Smart et al. . |
| 5,708,854 | 1/1998 | Smart et al. . |
| 5,727,247 | 3/1998 | Smart et al. . |
| 5,748,989 | 5/1998 | Sangregory et al. . |
| 5,748,990 | 5/1998 | Smart et al. . |

FOREIGN PATENT DOCUMENTS

| | | |
|---|---|---|
| 8-201987 | 8/1996 | Japan . |
| 8-201990 | 8/1996 | Japan . |
| 8-254792 | 10/1996 | Japan . |

*Primary Examiner*—David M. Gray
*Attorney, Agent, or Firm*—Roger A. Fields

[57] ABSTRACT

A one-time-use camera comprising a film cassette with a film spool that is rotated in an unwinding direction during camera manufacture to unwind a filmstrip from the cassette to form an unexposed film roll and in a winding direction during camera use to wind the filmstrip from the unexposed film roll into the cassette and with a light lock that is open when the filmstrip is unwound from the cassette or wound into the cassette and that is otherwise closed, a closing mechanism operable to close the light lock which includes a film sensor, and a film winder rotatable in the winding and unwinding directions when coaxially engaged with the film spool and engageable with the closing mechanism to operate the closing mechanism to close the light lock, is characterized in that the closing mechanism has an engageable portion that can be engaged with the film winder to cause rotation of the film winder in the winding direction to urge the film sensor against the filmstrip and a non-engageable portion that cannot be engaged with the film winder, and is supported for movement to position the non-engageable portion against the film winder to prevent the engageable portion from being engaged with the film winder when the film winder is rotated in the unwinding direction, whereby the engageable portion will be protected from becoming worn when the film winder is coaxially engaged with the film spool and rotated in the unwinding direction during camera manufacture.

5 Claims, 13 Drawing Sheets

ONE-TIME-USE CAMERA WITH CLOSING MECHANISM TO CLOSE CASSETTE DISABLED WHEN UNEXPOSED FILM PREWOUND FROM CASSETTE DURING CAMERA MANUFACTURE

CROSS REFERENCE TO RELATED APPLICATIONS

Reference is made to commonly assigned copending applications Ser. No. 09/243,861, entitled CAMERA WITH FILM WINDER HAVING SINGLE DUAL-FUNCTION PART FOR WINDING EXPOSED FILMSTRIP INTO CASSETTE AND FOR CLOSING CASSETTE and filed Feb. 3, 1999 in the names of Jude A. San Gregory & Anthony DiRisio, Ser. No. 09/243,864, entitled CAMERA WITH FILM SENSOR TO DETERMINE WHEN TO CLOSE CASSETTE NOT URGED AGAINST FILMSTRIP DURING EXPOSURE and filed Feb. 3, 1999 in the names of Jude A. SanGregory, Anthony DiRisio & Thomas E. Dussinger, Ser. No. 09/243,863, entitled CAMERA WITH CLOSING MECHANISM TO CLOSE CASSETTE and filed Feb. 3, 1999 in the names of Jude A. SanGregory & Douglas A. Pearson, Ser. No. 09/243,661, entitled CAMERA WITH CLOSING LEVER PIVOTALLY SUPPORTED ON CASSETTE TO CLOSE CASSETTE and filed Feb. 3, 1999 in the name of Jude A. SanGregory, and Ser. No. 09/243,865, entitled ONE-TIME-USE CAMERA WITH FILM SENSOR TO DETERMINE WHEN TO CLOSE CASSETTE DISABLED WHEN CASSETTE CLOSED and filed Feb. 3, 1999 in the names of Jude A. SanGregory & Thomas E. Dussinger.

FIELD OF THE INVENTION

The invention relates generally to the field of photography, and in particular to so-called one-time-use or disposable cameras. More specifically, the invention relates to a one-time-use camera in which a closing mechanism is operated to close the light lock of a film cassette after a filmstrip exposed in the camera is completely wound into the cassette.

BACKGROUND OF THE INVENTION

Film and cameras that are all in one, commonly referred to as one-time-use cameras, have become well known. The one-time-use camera is a simple point-and-shoot type comprising a plastic main body part which supports a conventional film cassette in a cassette receiving or film take-up chamber, an unexposed film roll prewound on a film spool in a film supply chamber from the film cassette, a fixed-focus taking lens, a film metering mechanism with a rotatably supported metering sprocket that engages the filmstrip, a manually rotatable film winding thumbwheel rotatably engaged with a film spool inside the film cassette, a single-blade shutter, a manually depressible shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cassette. This winds an exposed section of the filmstrip into the film cassette. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cassette, the one-time-use camera is given to a photofinisher who tears the outer box off the camera unit, separates the rear cover part from the main body part, and removes the film cassette with the exposed filmstrip from the film take-up chamber. Then, he removes the exposed filmstrip from the film cassette to develop the negatives and make prints for the customer. At least some of the used camera parts may be recycled, i.e. reused, to remanufacture the camera.

More recently, the one-time-use camera has been adapted to be used with the type of film cassette that has a light lock which is to be pivoted closed after the filmstrip is completely wound into the cassette following the last exposure. The light lock must be pivoted closed to prevent ambient light from entering the film cassette when the cassette is removed from the camera. Commonly assigned U.S. Pat. No. 5,608,480 issued Mar. 4, 1997 discloses a one-time-use camera for use with this film cassette. The camera includes a film winding thumbwheel in coaxial engagement with a film spool inside the film cassette for rotating the film spool in a film winding direction to progressively wind the filmstrip into the cassette following each exposure, and a closing mechanism having a film sensing component that is spring-urged against the filmstrip as the filmstrip is wound into the cassette and a closing component in rotational engagement with the light lock. The film sensing component determines that the filmstrip is completely wound into the cassette, and the closing component then closes the light lock. When the filmstrip is completely wound into the cassette, the film sensing component is spring-urged to rotate the closing component to partially close the light lock and to be positioned for engagement with the thumbwheel. Then, the thumbwheel is rotated in the film winding direction to engage and move the closing device to fully close the light lock.

THE CROSS-REFERENCED APPLICATIONS

Cross-referenced application Ser. No. 09/243,861, entitled CAMERA WITH FILM WINDER HAVING SINGLE DUAL-FUNCTION PART FOR WINDING EXPOSED FILMSTRIP INTO CASSETTE AND FOR CLOSING CASSETTE discloses a camera comprising a chamber for a film cassette having a film spool inside the cassette that is windingly rotated to progressively wind an exposed filmstrip into the cassette and a light lock that is to be closed after the exposed filmstrip is completely wound into the cassette, a rotatable film winder for windingly rotating the film spool, and a closing mechanism operated to close the light lock, characterized in that the film winder has a single, distinct, dual-function part configured on the film winder to engage the film spool in order to windingly rotate the film spool and to engage the closing mechanism to operate the closing mechanism.

Cross-referenced application Ser. No. 09/243,864, entitled CAMERA WITH FILM SENSOR TO DETER- MINE WHEN TO CLOSE CASSETTE NOT URGED AGAINST FILMSTRIP DURING EXPOSURE discloses a camera comprising a chamber for a film cassette having a film spool inside the cassette that is windingly rotated to progressively wind an exposed filmstrip into the cassette and a light lock that is to be closed after the exposed filmstrip is completely wound into the cassette, a rotatable film winder for windingly rotating the film spool, a film sensor urged against the exposed filmstrip before the exposed filmstrip is completely wound into the cassette to sense the presence of the exposed filmstrip, and a closing mechanism movable to close the light lock when the exposed filmstrip is completely wound into the cassette, characterized in that the film winder has an urging component that urges the film sensor against the exposed filmstrip only when the film winder is rotated, whereby the film sensor is not urged against the exposed filmstrip when the film winder is stationary. Thus, the film sensor will not distort the filmstrip during exposure.

Cross-referenced application Ser. No. 09/243,863, entitled CAMERA WITH CLOSING MECHANISM TO CLOSE CASSETTE discloses a camera comprising a chamber for a film cassette having a film passageway through which an exposed filmstrip is progressively moved into the cassette and a light lock that is to be closed within the film passageway after the exposed filmstrip is completely moved into the cassette, and a movable closing mechanism for closing the light lock, characterized in that the closing mechanism has a closing portion configured on the closing mechanism to be moved from outside the film passageway to inside the film passageway when the exposed filmstrip is moved completely into the cassette, in order to close the light lock.

Cross-referenced application Ser. No. 09/243,661, entitled CAMERA WITH CLOSING LEVER PIVOTALLY SUPPORTED ON CASSETTE TO CLOSE CASSETTE discloses a camera comprising a chamber for a film cassette having a light lock that is to be closed when an exposed filmstrip is completely moved into the cassette, and a movable closing mechanism for closing the light lock, characterized in that the closing mechanism has a closing lever with a pivot support configured on the closing lever to engage the film cassette separate from the light lock in order to support the closing lever on the film cassette for pivotal movement to close the light lock.

Cross-referenced application Ser. No. 09/243,865, entitled ONE-TIME-USE CAMERA WITH FILM SENSOR TO DETERMINE WHEN TO CLOSE CASSETTE DISABLED WHEN CASSETTE CLOSED discloses a one-time-use camera comprising a film cassette which has a filmstrip that is to be progressively wound into the cassette following each exposure and a light lock that is to be closed after the filmstrip is completely wound into the cassette, and a single-piece closing unit for closing the light lock which has a film sensing portion in contact with the filmstrip as the filmstrip is progressively wound into the cassette to determine when the filmstrip is completely wound into the cassette and a closing portion movable to close the light lock when the film sensing portion determines that the filmstrip is completely would into the cassette, characterized in that a fixed stop is arranged opposite the cassette to form a capture space for the film sensing portion between the fixed stop and the cassette, the film sensing portion is connected to the closing portion at an intermediate weakened portion that is constructed to allow the film sensing portion to be folded towards the closing portion without becoming separated from the closing portion, and the single-piece closing unit is supported for pivotal movement to pivot the closing portion to close the light lock and to pivot the film sensing portion sequentially against the fixed stop and folded into the capture space, whereby the film sensing portion will be trapped in the capture space without being separated from the closing portion to secure the closing portion in place holding the light lock closed.

PROBLEM

During manufacture of the one-time-use camera, the light lock must be open to permit the filmstrip to be prewound from the film cassette onto the film spool in the film supply chamber to form the unexposed film roll on the film spool. The filmstrip is prewound from the film cassette at a relatively high speed, which causes the film winding thumbwheel to be rotated in a film unwinding direction at a similar high speed. If the thumbwheel is then engaged with the closing mechanism, the engaged portions may become prematurely worn.

SUMMARY OF THE INVENTION

A one-time-use camera comprising a film cassette with a film spool that is rotated in an unwinding direction during camera manufacture to unwind a filmstrip from the cassette to form an unexposed film roll and in a winding direction during camera use to wind the filmstrip from the unexposed film roll into the cassette and with a light lock that is open when the filmstrip is unwound from the cassette or wound into the cassette and that is otherwise closed, a closing mechanism operable to close the light lock which includes a film sensor, and a film winder rotatable in the winding and unwinding directions when coaxially engaged with the film spool and engageable with the closing mechanism to operate the closing mechanism to close the light lock, is characterized in that:

the closing mechanism has an engageable portion that can be engaged with the film winder to cause rotation of the film winder in the winding direction to urge the film sensor against the filmstrip and a non-engageable portion that cannot be engaged with the film winder, and is supported for movement to position the non-engageable portion against the film winder to prevent the engageable portion from being engaged with the film winder when the film winder is rotated in the unwinding direction, whereby the engageable portion will be protected from becoming worn when the film winder is coaxially engaged with the film spool and rotated in the unwinding direction during camera manufacture.

DETAILED DESCRIPTION OF THE INVENTION

The invention is disclosed as being embodied preferably in a one-time-use or disposable camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Film Cassette

Referring now to the drawings, FIGS. 1–5 and 9–13 show a known film cassette 10 similar in operation to ones disclosed in U.S. Pat. No. 5,537,303 issued Oct. 18, 1984, and No. 5,231,438 issued Jul. 27, 1993. The film cassette 10 has a cassette shell 12 that contains a rotatable film spool 14 on which is stored a wound unexposed/exposed filmstrip 16. A pivotable light lock 18 inside the cassette shell 12 is pivoted open within a film egress/ingress passageway 20 in the shell to permit film movement out of and back into the shell, through the passageway, and is pivoted closed within the passageway to prevent ambient light from entering the shell, through the passageway.

Figure 1:
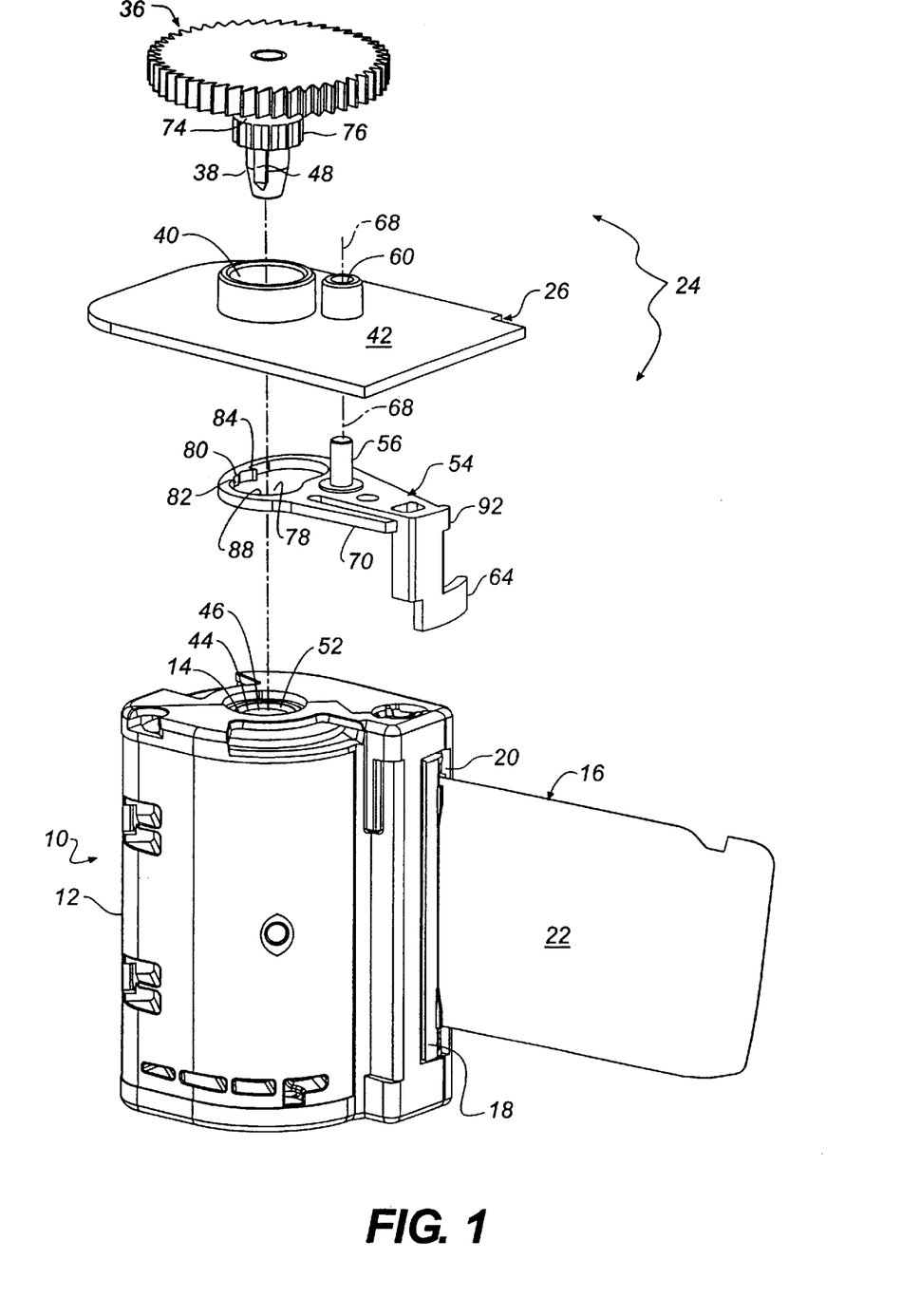
FIG. 1 is a front exploded perspective view partially of a one-time-use or disposable camera according to a preferred embodiment of the invention.
Figure 2:
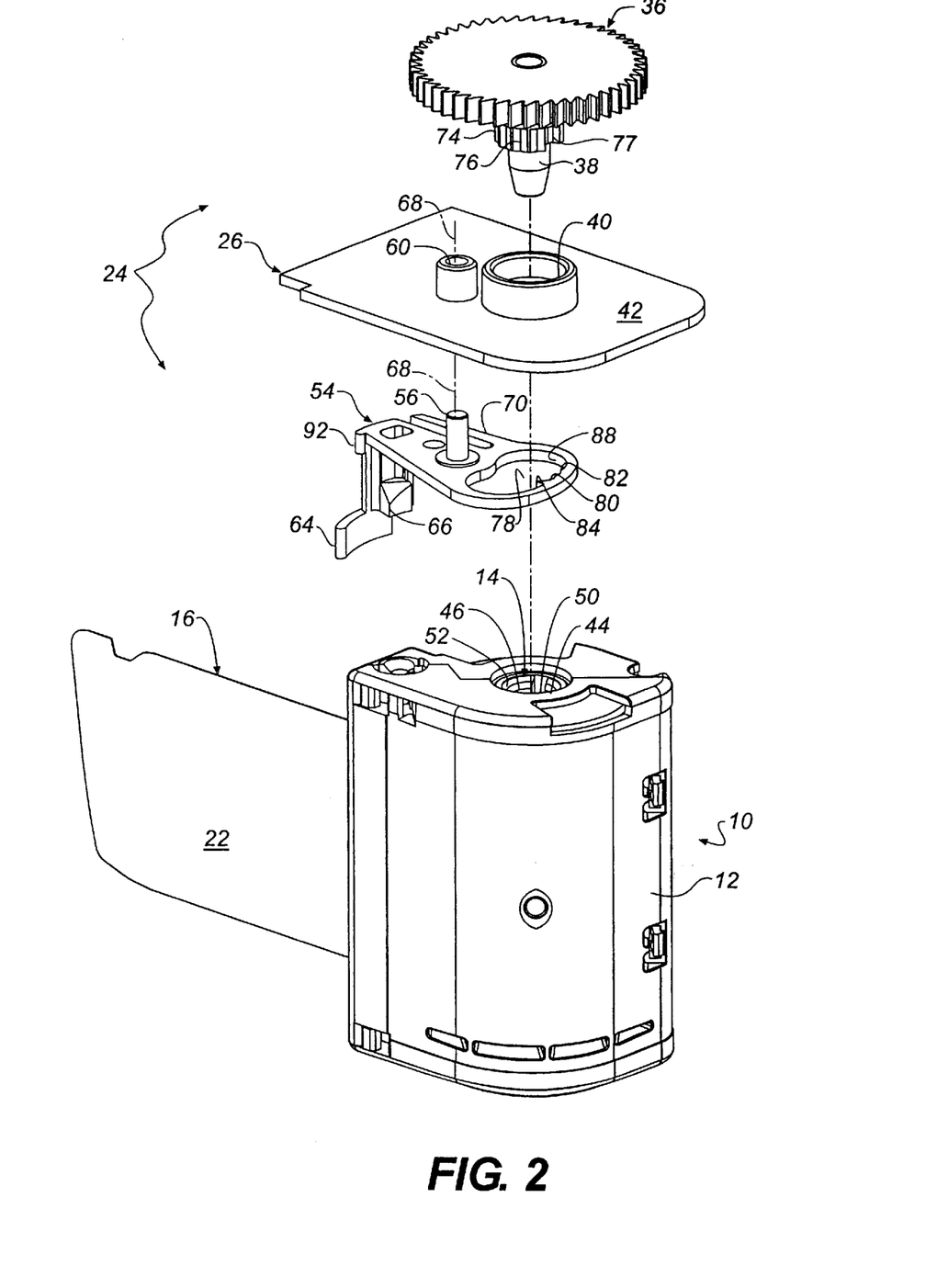
FIG. 2 is a rear exploded perspective view partially of the camera as shown in FIG. 1.
Figure 3:
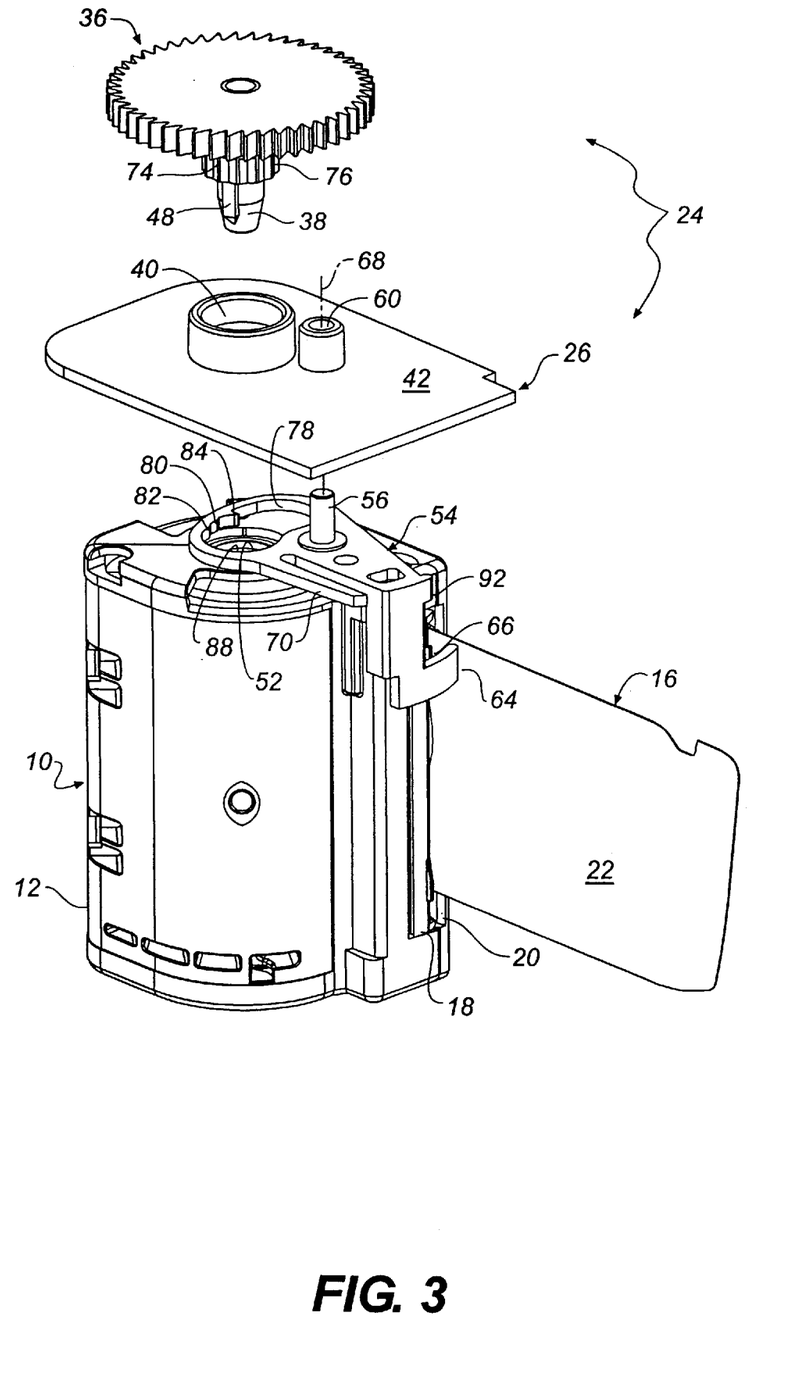
FIG. 3 is a front perspective view similar to FIG. 1, showing the camera partially assembled.
Figure 4:
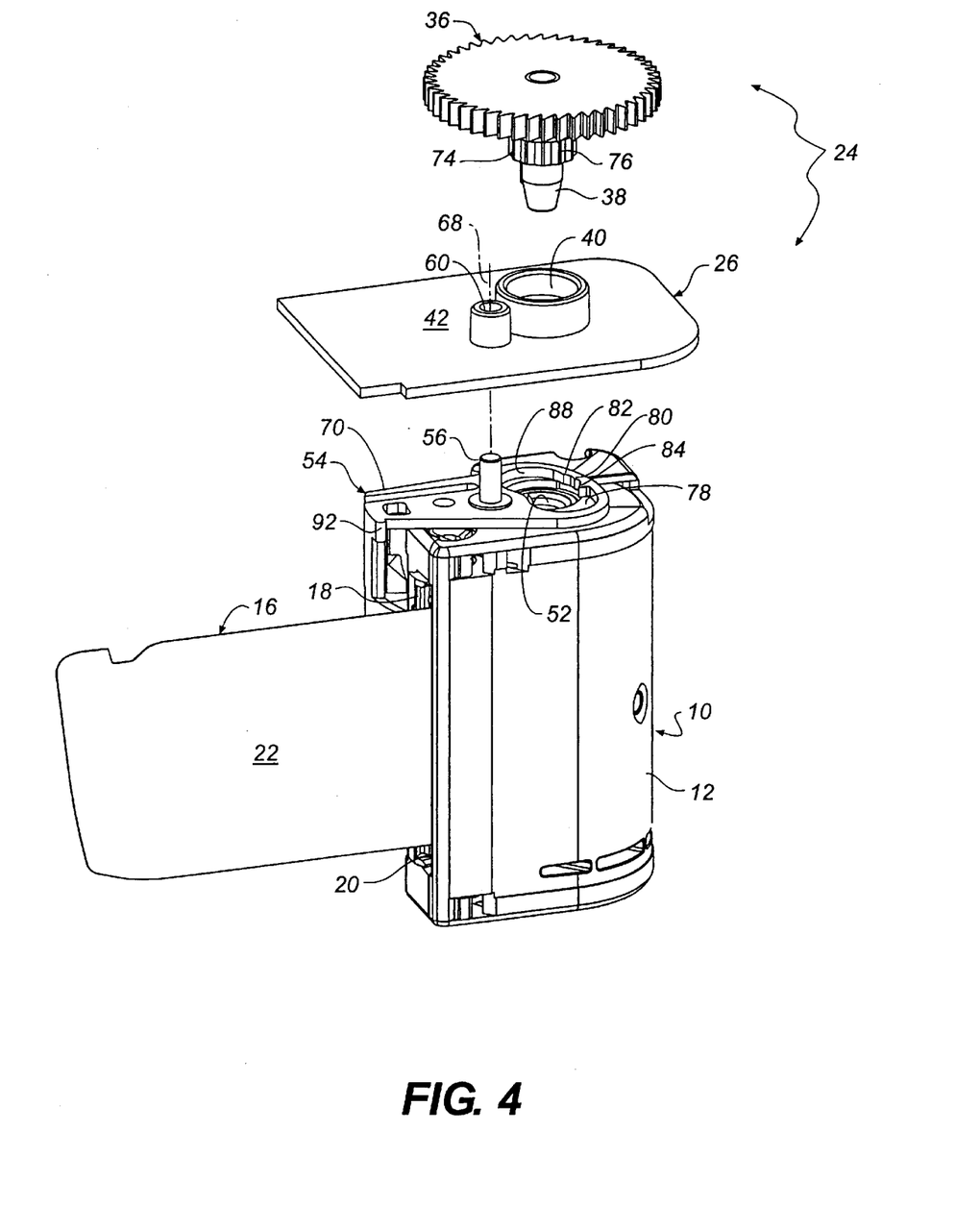
FIG. 4 is a rear perspective view similar to FIG. 2, showing the camera partially assembled.
Figure 5:
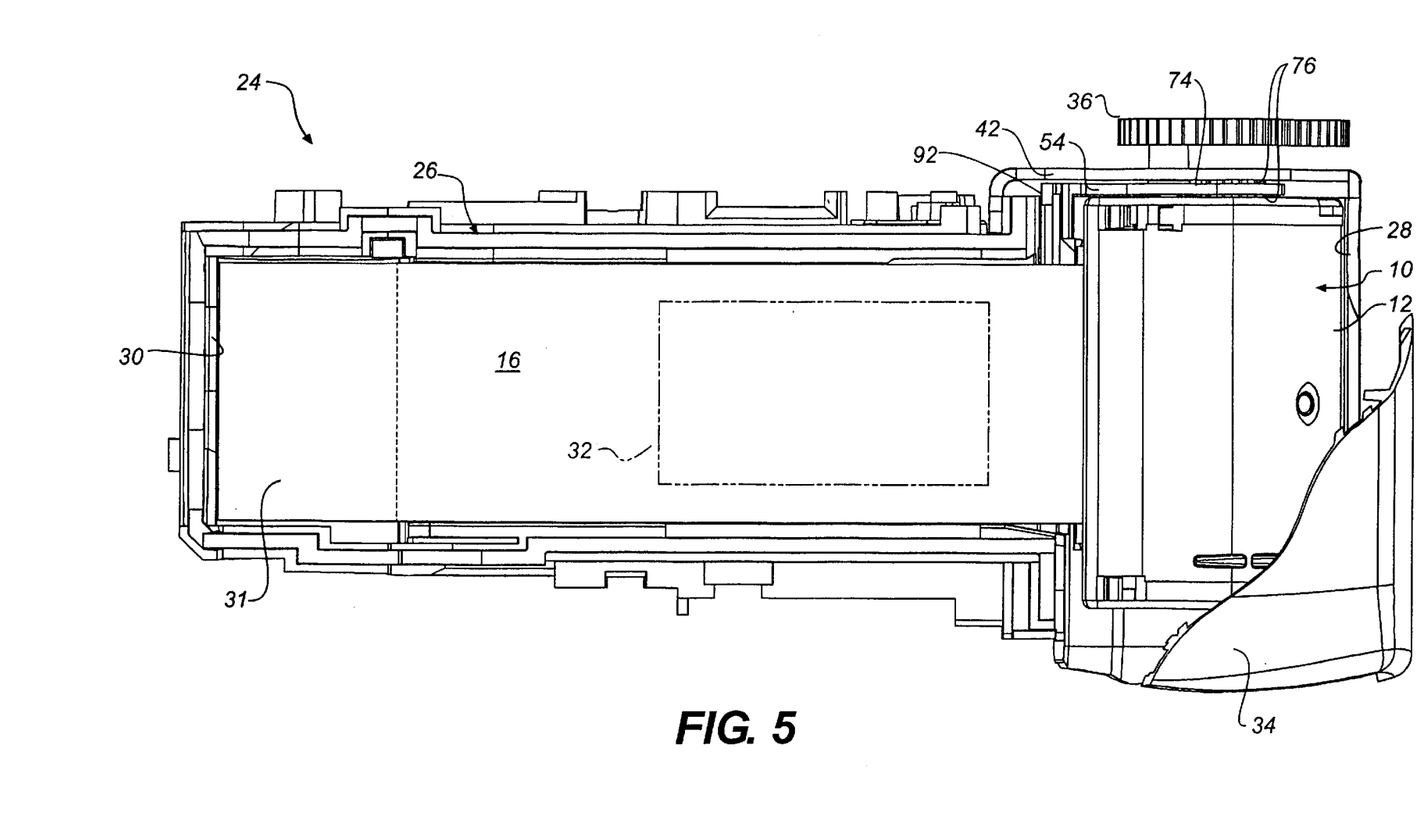
FIG. 5 is a rear elevation view partially of the camera.
Figure 6:
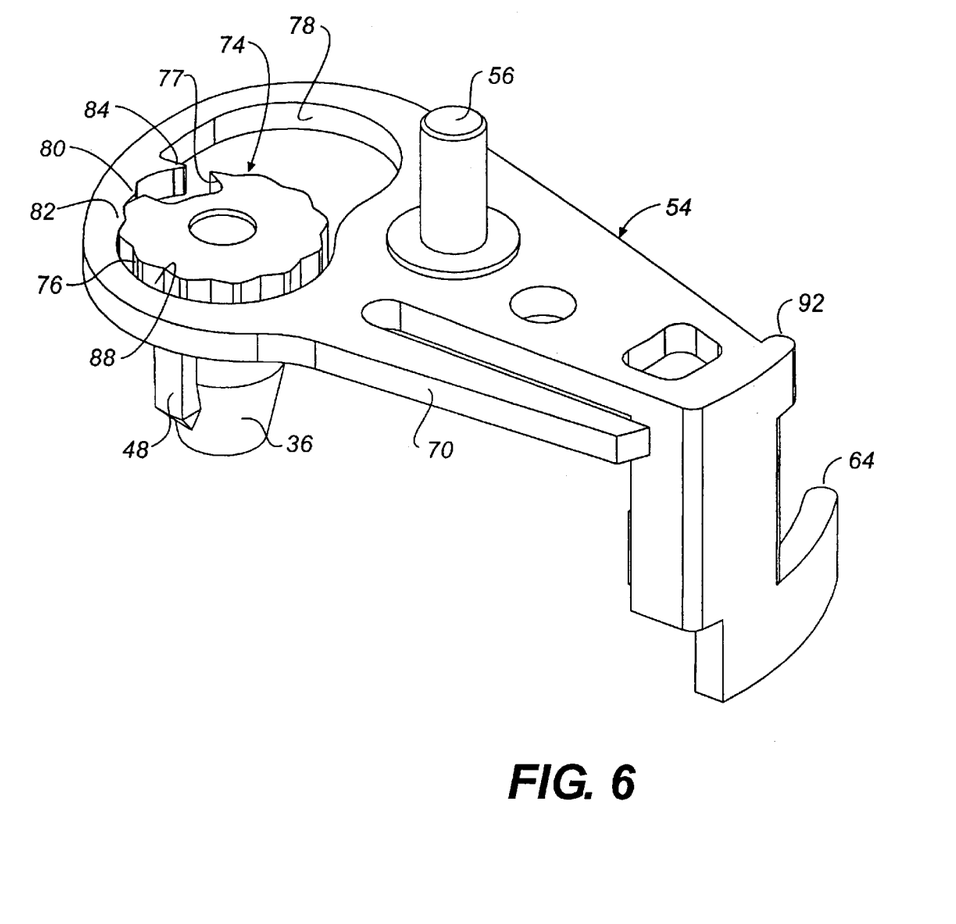
FIG. 6 is a front top plan view of a film winder and a film sensing and light lock closing lever in the camera that operate to close the light lock of a film cassette after the film winder has completely wound an exposed filmstrip into the cassette following the last exposure.
Figure 7:
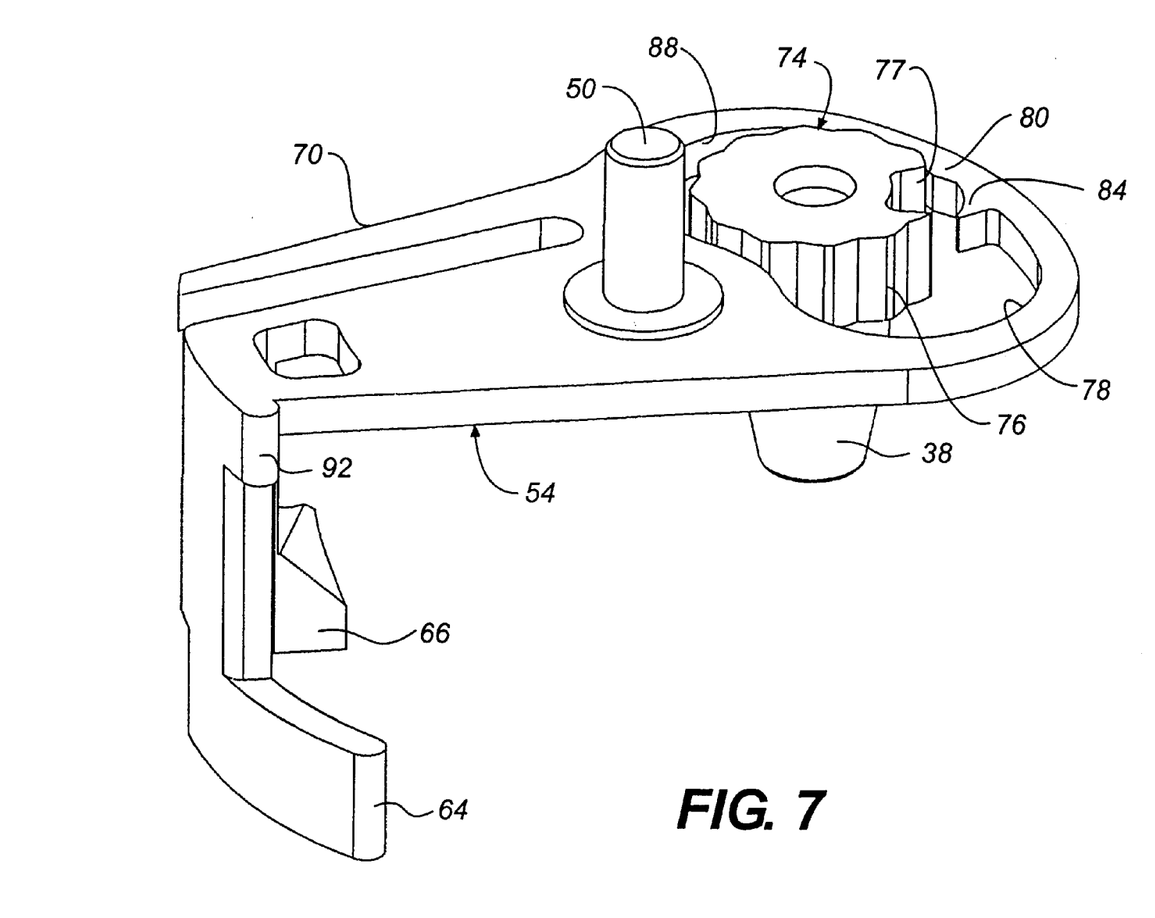
FIG. 7 is a rear top plan view similar to FIG. 6.
Figure 8:
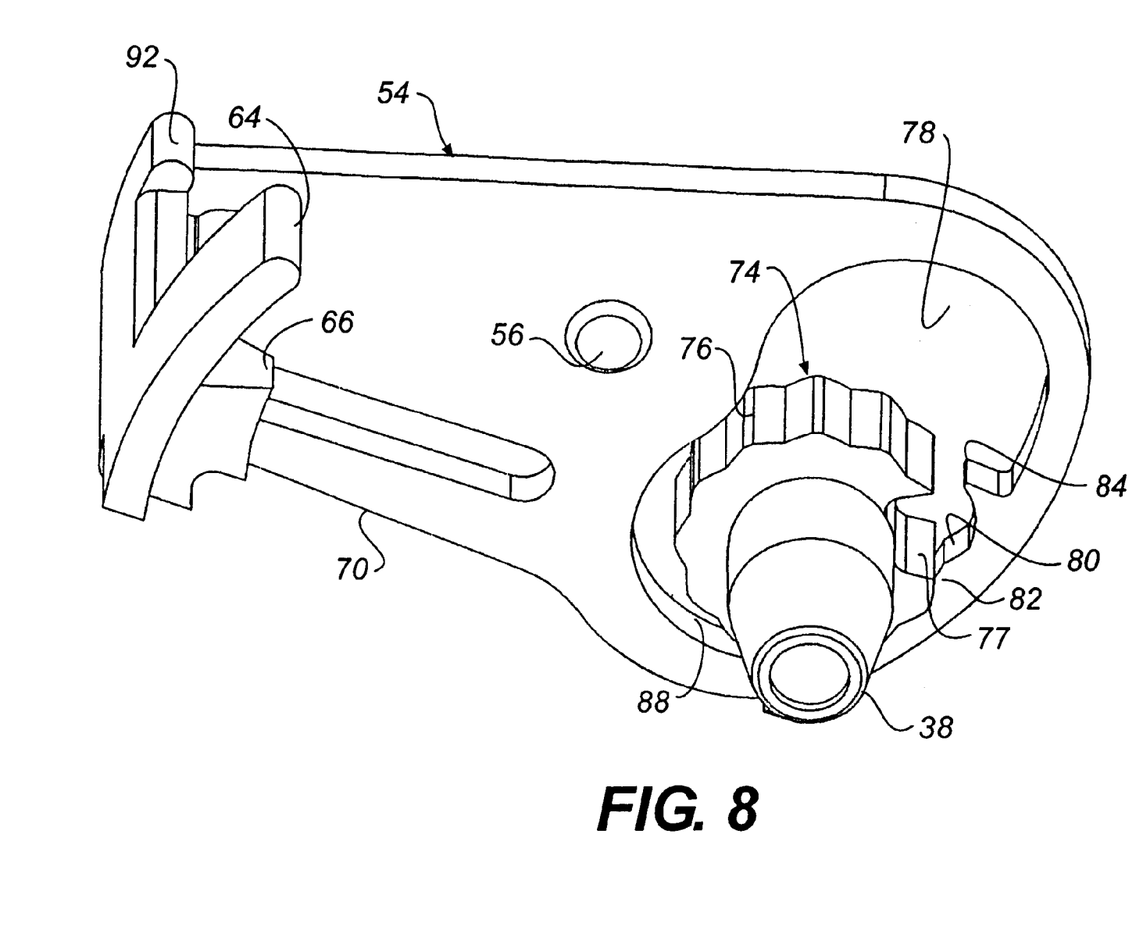
FIG. 8 is a rear bottom perspective view similar to FIG. 6.
Figure 9:
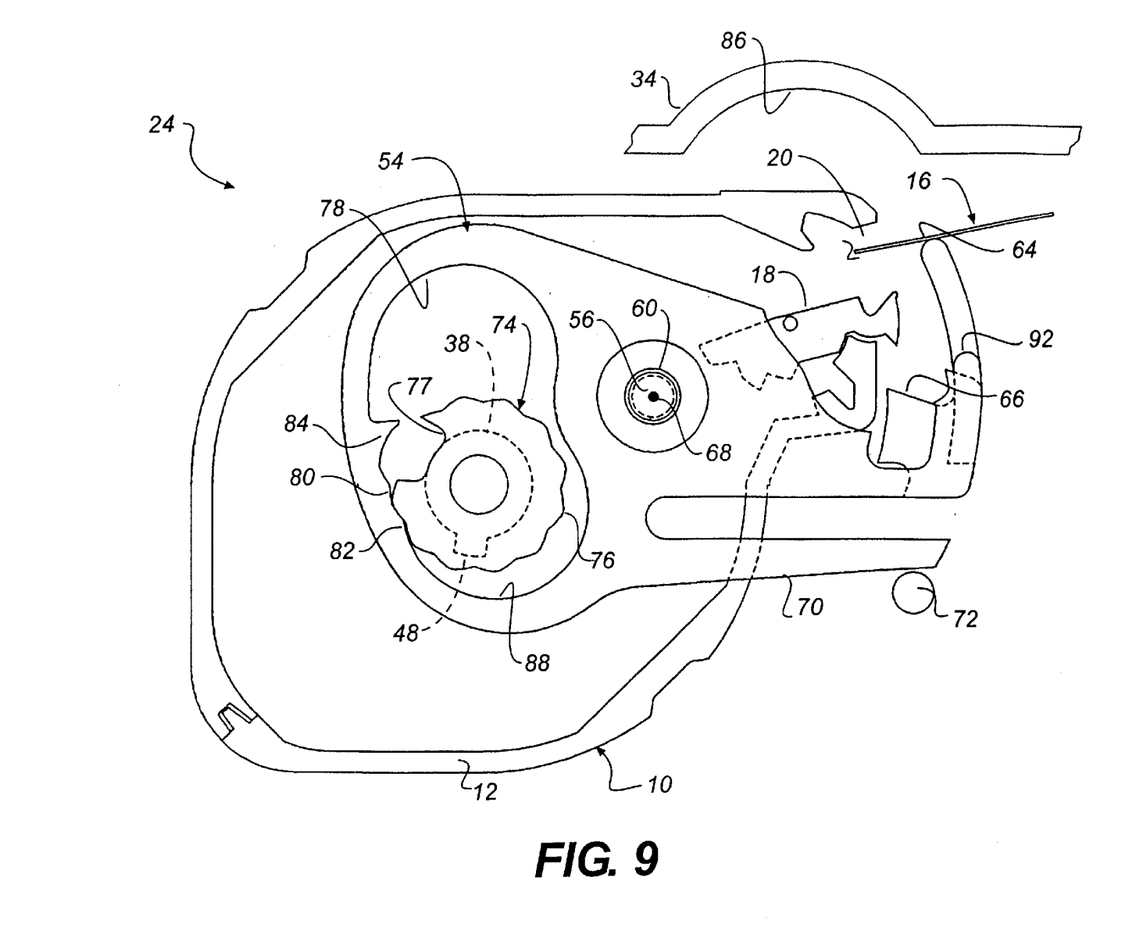
FIGS. 9, 10 and 11 are top plan views of the film winder and the film sensing and light lock closing lever, depicting their operation during use of the camera.
Figure 11:
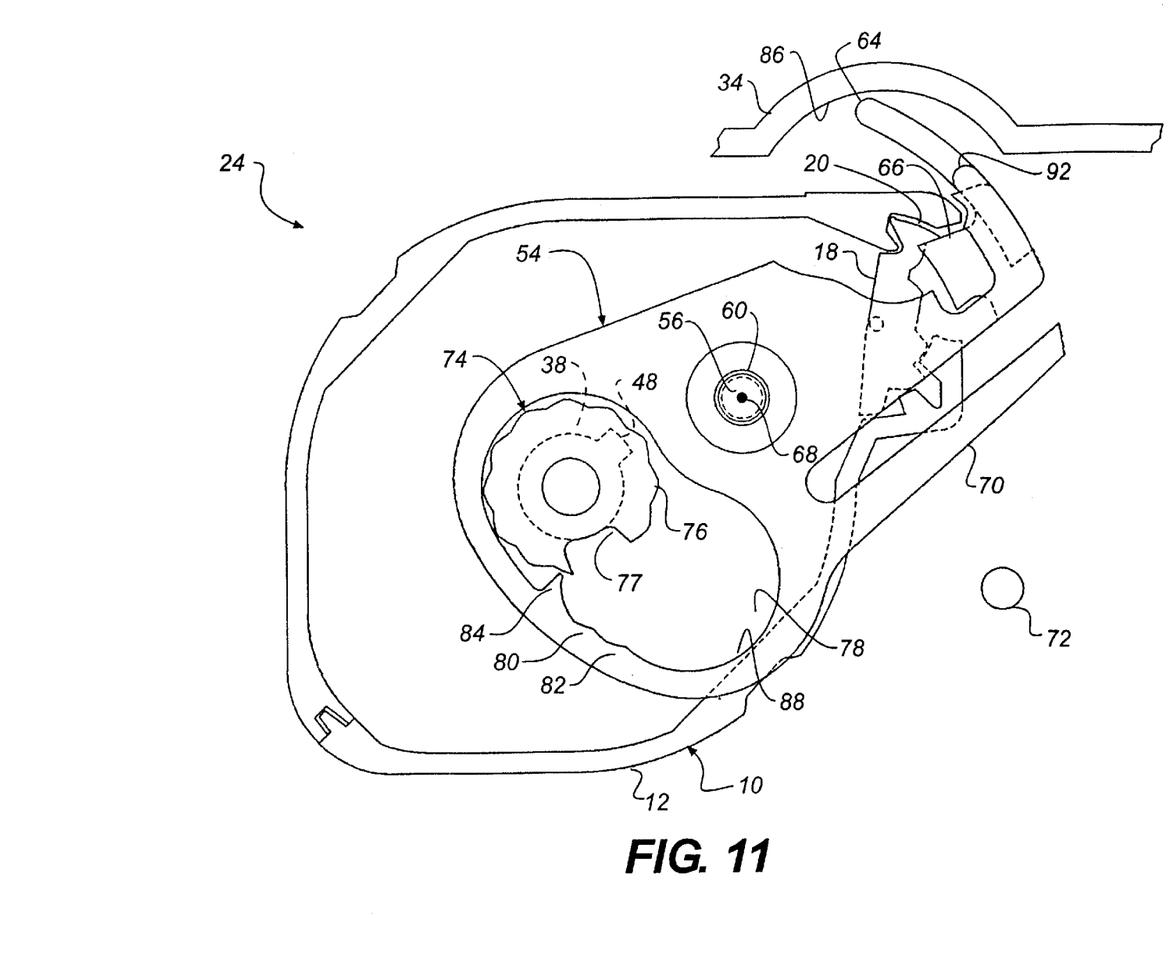

FIGS. 1 and 2 show the film cassette from front and rear sides, respectively, with the light lock 18 pivoted open. The filmstrip 16 except for a trailing film end portion 22 has been wound into the cassette shell 12 after being exposed outside the cassette shell. FIG. 9 shows the light lock 18 open immediately before the trailing film end portion 22 is wound into the cassette shell 12. FIG. 11 shows the light lock 18 pivoted closed immediately after the trailing film end portion 22 is into the cassette shell 12.

One-Time-Use Camera

FIGS. 1–13 partially show a one-time-use or disposable camera 24 with the film cassette 10. The camera 24 includes a main body part 26 having a cassette receiving or film take-up chamber 28 for the film cassette 10, a film supply chamber 30 in which the filmstrip 16 is provided as an unexposed film roll 31, and a backframe opening 32 at which successive frames of the filmstrip are exposed. See FIG. 5. After each exposure, the exposed frame is wound onto the film spool 14 inside the cassette shell 12. A rear cover part 34 light-tightly covers the cassette receiving chamber 28, the film supply chamber 30 and the backframe opening 32.

A single-piece, manually rotatable film winder or thumbwheel 36 has a coaxially depending stem 38 that extends through a bearing hole 40 in a top portion 42 of the main body part 26 and into an accessible cavity 44 in a spool core 46 of the film spool 14. The depending stem 38 has a key protuberance 48 that extends radially from and longitudinally along the depending stem to rotationally engage the spool core 46 at a mating slot 50 in the spool core, beginning at an exposed end 52 of the spool core. See FIGS. 1 and 2. The thumbwheel 36 is intended to be manually rotated in a film winding direction which is counter-clockwise in FIGS. 1 and 2 to similarly rotate the film spool 14 in order to wind the filmstrip 16 incrementally onto the film spool following each exposure at the backframe opening 32, and to then wind the trailing film end portion 22 onto the film spool following the last exposure.

As shown in FIGS. 1–13, a single-piece closing lever 54 for pivoting the light lock 18 closed after the trailing film end portion 22 has been wound into the film cassette 10 has an upstanding coaxial pivot pin 56 that is pivotally supported in a bearing or pivot hole 60 in the top portion 42 of the main body part 26. The closing lever 54 has a pair of film sensing and light lock closing surfaces 64 and 66 that are parallel and offset from one another and face generally in the same direction. Both of the film sensing and light lock closing surfaces 64 and 66 are located outside the cassette shell 12 in FIGS. 1–4, 9, 10, 12 and 13. The closing lever 54 is pivotable about an axis 68 depicted in FIG. 1. A resilient arm 70 of the closing lever is positioned against a fixed stop 72 on the main body part 26 in FIG. 9.

A collar 74 is arranged on the depending stem 38 of the thumbwheel 36 to extend radially farther than the key protubererance 48 from the depending stem, and it has a series of friction providing peripheral teeth 76. A peripheral notch 77 in the collar 74 interrupts the series of teeth 76 on the collar. See FIGS. 1, 3, 6 and 9–13. Both the teeth 76 and the notch 77 are located within an opening 78 in the closing lever 54, adjacent the exposed end 52 of the spool core 46. When the thumbwheel 36 is manually rotated in the film winding direction which is counter-clockwise in FIG. 9, the teeth 76 on the collar 74 are moved into and out of successive engagement with two adjacent teeth 80 and 82 on the closing lever 54, within the opening 78, to slightly pivot the closing lever counter-clockwise about the axis 68 in order to urge the film sensing surface 64 of the closing lever against the filmstrip 16 (including the trailing film end portion 22). The resistance of the filmstrip 16 (including the trailing film end portion 22) at the film sensing surface 64 of the closing lever 54 prevents the closing lever from being further pivoted to position the light lock closing surface 66 of the closing lever against the light lock 18 in FIG. 9.

When the thumbwheel 36 is stationary, i.e. not rotated, the teeth 76 on the collar 74 do not operate to urge the film sensing surface 64 of the closing lever 54 against the filmstrip 16. Instead, the film sensing surface 64 merely floats or rests on the filmstrip 16. This is beneficial because the filmstrip 16 will not then be distorted at the backframe opening 32 during exposure.

Figure 10:
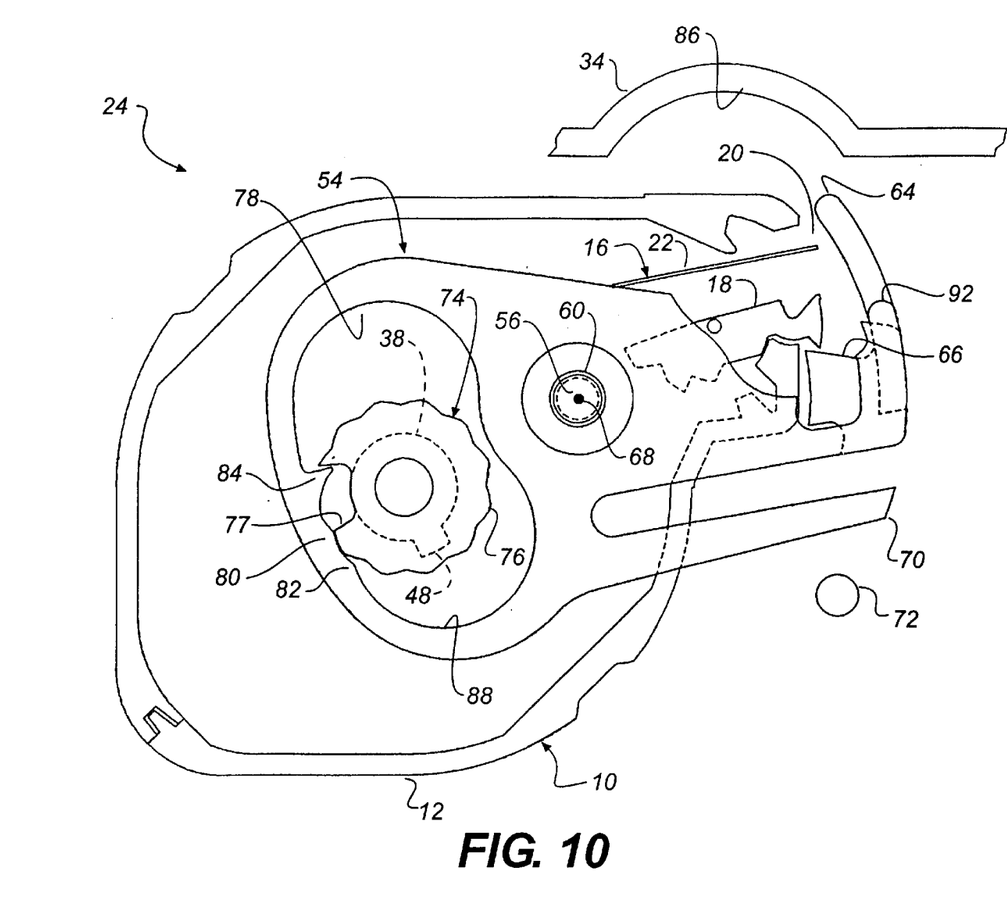

When the filmstrip 16 is completely wound into the cassette shell 12 as shown in FIG. 10, the filmstrip is removed from the film sensing surface 64 of the closing lever 54. Since there is now no resistance of the filmstrip 16 at the film sensing surface 64, when the thumbwheel 36 is manually rotated in the film winding direction which is counter-clockwise in FIG. 10, to move the teeth 76 on the collar 74 into and out of successive engagement with the two teeth 80 and 82 on the closing lever 54, the closing lever will be slightly pivoted counterclockwise about the axis 68 in FIG. 10 to urge the light lock closing surface 66 of the closing lever against the light lock 18 as shown in FIG. 10. The film sensing surface 64 of the closing lever 54 is then positioned across the film passageway 20 in the cassette shell 12 and the notch 77 in the collar 74 is now within reach of a relatively large tooth 84 on the closing lever 54, within the opening 78 in the closing lever.

The continued rotation of the thumbwheel 36 in the film winding direction which is counter-clockwise in FIG. 10 moves the notch 77 in the collar 74 to receive the tooth 84 on the closing lever 54, to pivot the closing lever counter-clockwise about the axis 68. This moves the light lock closing surface 66 of the closing lever 54 from immediately outside the film passageway 20 in the cassette shell 12, as shown in FIG. 10, to slightly inside the film passageway, as shown in FIG. 11, to pivot the light lock 18 closed. The film sensing surface 64 of the closing lever 54 is then positioned within a recess 86 in the rear cover part 34.

Manufacture

Figure 13:
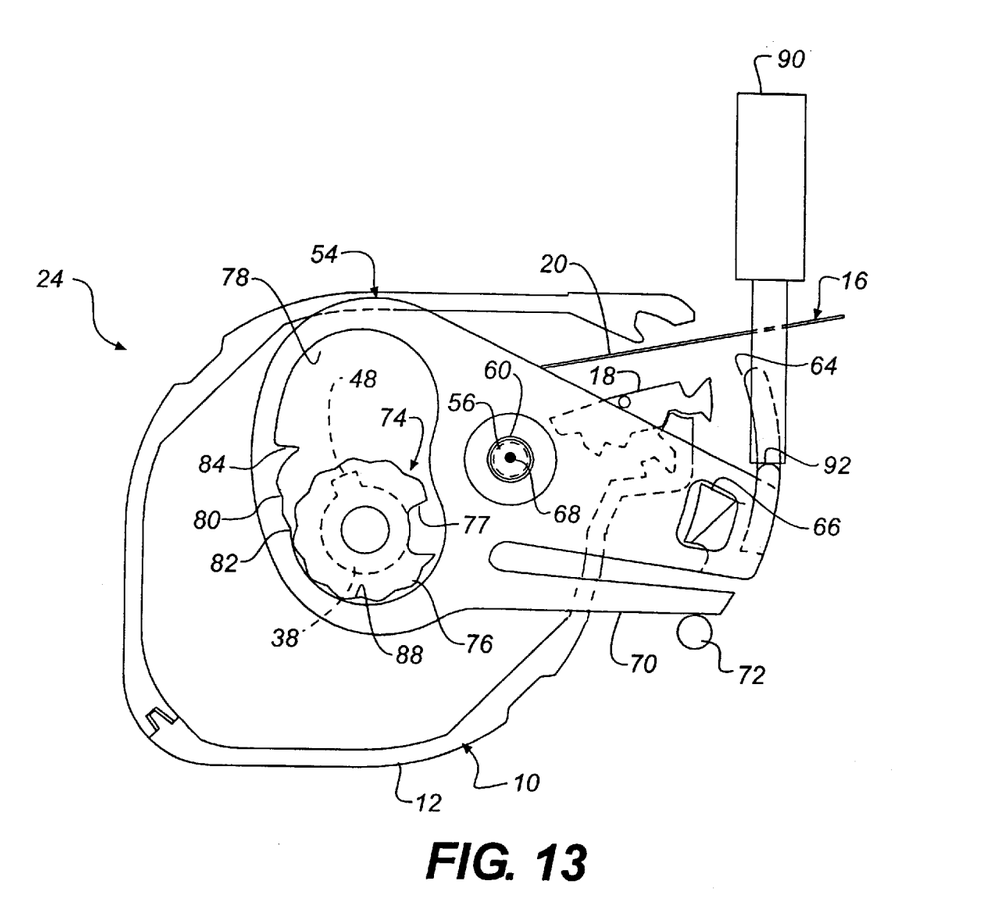

During manufacture of the one-time-use camera 24, the light lock 18 must be open to permit the filmstrip 16 to be prewound from the film cassette 10 to form the unexposed film roll 31 in the film supply chamber 30. The filmstrip 16 is prewound from the film cassette 10 continuously at a relatively high speed which causes the film winding thumbwheel 36 to be rotated in a film unwinding direction, clockwise in FIG. 13, at a similar high speed. If the teeth 76 on the collar 74 are moved into and out of successive engagement with the teeth 80 and 82 on the closing lever 54 when the thumbwheel 36 is rotated in the film unwinding direction, they may become prematurely worn. Accordingly, a non-engageable toothless area 88 is provided on the closing lever 54, within the opening 78 in the closing lever, which can be re-positioned against the teeth 76 on the collar 74 as shown in FIG. 13. The teeth 76 on the collar 74 cannot, therefore, be moved into and out of successive engagement with the teeth 80 and 82 on the closing lever 54. The toothless area 88 on the closing lever 54 is re-positioned against the teeth 76 on the collar 74 by pivoting the closing lever clockwise in FIG. 13 about the axis 68.

Figure 12:
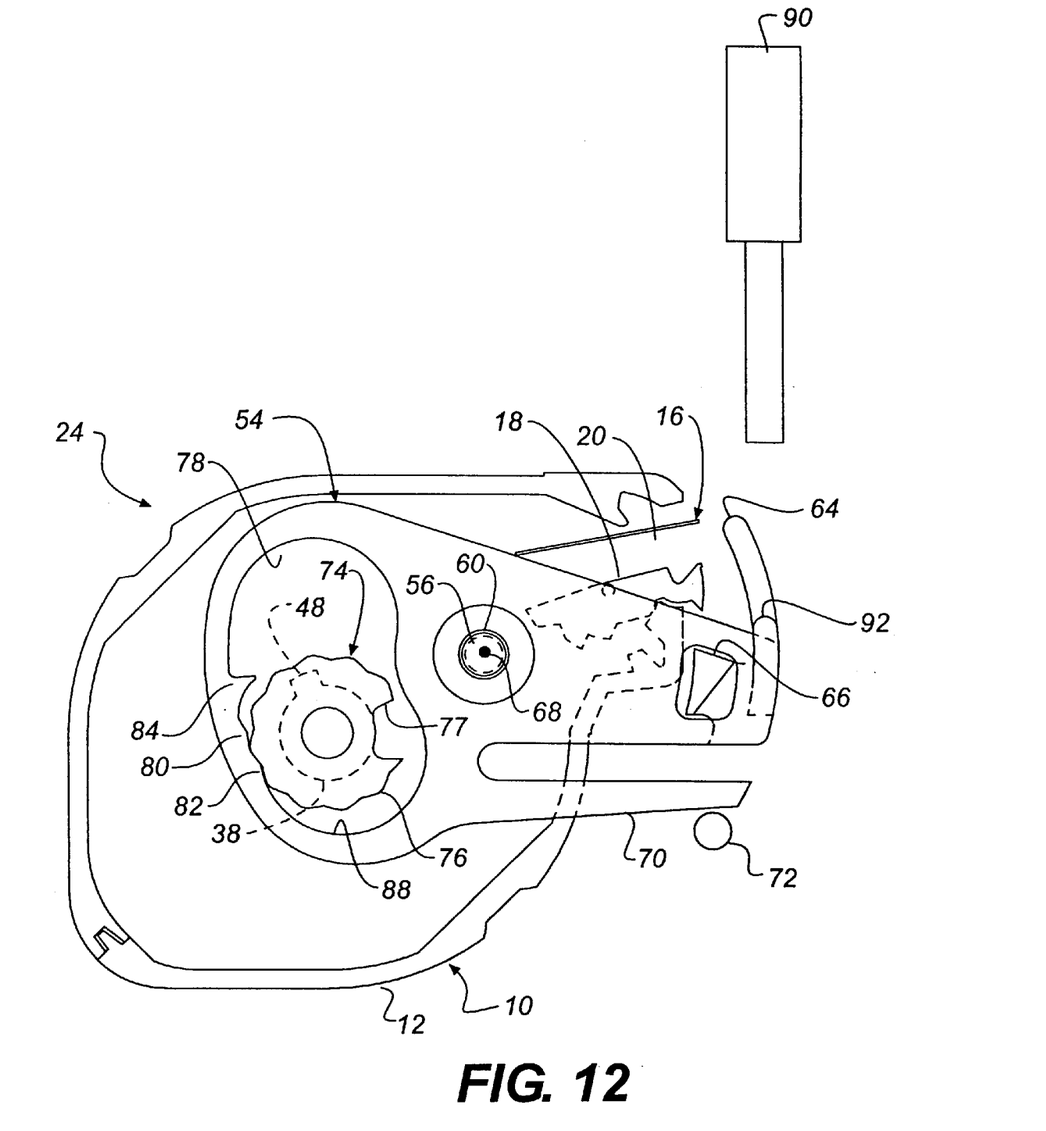
FIGS. 12 and 13 are top plan views of the film winder and the film sensing and light lock closing lever, depicting them being disabled during manufacture of the camera.

A method of film loading during manufacture of the one-time-use camera 24 begins with the rear cover part 34 not attached to the main body part 26 as shown in FIG. 12, and comprises the steps of:

inserting the film cassette 10 into the cassette receiving chamber 28 in the main body part 26 and rotationally engaging the spool core 46 of the film spool 14 inside the cassette shell 12 with the key protuberance 48 on the depending stem 38 of the film winding thumbwheel 36;

opening the light lock 18 before or after the film cassette 10 is inserted into the cartridge receiving chamber 28;

pushing a tool 90 against a projection 92 on the closing lever 54 to pivot the closing lever clockwise in FIG. 13 to move the two teeth 80 and 82 on the closing lever out of engagement with the teeth 76 on the collar 74 and to move the toothless area 88 on the closing lever against the teeth on the collar to prevent the two teeth on the closing lever from becoming engaged with the teeth on the collar; and prewinding the filmstrip 16 from the film cassette 10 to form the unexposed film roll 31 in the film supply chamber 30.

Since the toothless area 88 on the closing lever 54 is positioned against the teeth 76 on the collar 74, the two teeth 80 and 82 on the closing lever and the teeth on the collar cannot become prematurely worn when the rotationally engaged film spool 14 and thumbwheel 36 are rotated as the filmstrip 16 is prewound from the film cassette 10.

The invention has been described with reference to a preferred embodiment. However, it will be appreciated that variations and modifications can be effected by a person of ordinary skill in the art without departing from the scope of the invention.

PARTS LIST 10. film cassette
12. cassette shell
14. film spool
16. filmstrip
18. light lock
20. film passageway
22. trailing film end portion
24. one-time-use camera
26. main body part
28. cassette receiving or film take-up chamber
30. film supply chamber
31. unexposed film roll
32. backframe opening
34. rear cover part
36. film winder or thumbwheel
38. depending stem
40. bearing hole
42. top portion
44. cavity
46. spool core
48. key protuberance
50. mating slot
52. exposed end
54. closing lever
56. pivot pin
60. pivot hole
64. film sensing surface
66. light lock closing surface
68. axis
70. resilient arm
72. fixed stop
74. collar
76. teeth
77. notch
78. opening
80. tooth
82. tooth
84. tooth
86. recess
88. toothless area
90. tool
92. projection

What is claimed is:

1. A one-time-use camera comprising a film cassette with a film spool that is rotated in an unwinding direction during camera manufacture to unwind a filmstrip from said cassette to form an unexposed film roll and in a winding direction during camera use to wind said filmstrip from said unexposed film roll into said cassette and with a light lock that is open when said filmstrip is unwound from said cassette or wound into said cassette and that is otherwise closed, a closing mechanism operable to close said light lock which includes a film sensor, and a film winder rotatable in the winding and unwinding directions when coaxially engaged with said film spool and engageable with said closing mechanism to operate said closing mechanism to close said light lock, is characterized in that:

said closing mechanism has an engageable portion that can be engaged with said film winder to cause rotation of said film winder in the winding direction to urge said film sensor against said filmstrip and a non-engageable portion that cannot be engaged with said film winder, and is supported for movement to position said non-engageable portion against said film winder to prevent said engageable portion from being engaged with said film winder when said film winder is rotated in the unwinding direction, whereby said engageable portion will be protected from becoming worn when said when said film winder is coaxially engaged with said film spool and rotated in the unwinding direction during camera manufacture.

2. A one-time-use camera as recited in claim 1, wherein said engageable portion of said closing mechanism and said film winder have mutually engageable teeth that are engaged to cause rotation of said film winder in the winding direction to urge said film sensor against said filmstrip, and said non-engageable portion is toothless to prevent said teeth of said film winder from engaging said closing mechanism when said non-engageable portion is positioned against said film winder.

3. A one-time-use camera as recited in claim 2, wherein said closing mechanism is supported to be pivoted to move said engageable portion of said closing mechanism into and out of engagement with said film winder and to move said non-engageable portion of said closing mechanism against and away from said film winder.

4. A method of film loading during manufacture of a one-time-use camera which includes a film cassette with a film spool that is rotated in a winding direction for picture-taking to wind a filmstrip from an unexposed film roll into the cassette and with a light lock that is open when the filmstrip is wound into the cassette, a closing mechanism operable to close the light lock which includes a film sensor, and a film winder rotatable in the winding direction when coaxially engaged with the film spool and engageable with the closing mechanism to operate the closing mechanism to close the light lock, said method comprising:

inserting the film cassette into the one-time-use camera and coaxially engaging the film winder with the film spool;

opening the light lock before or after the film cassette is inserted into the one-time-use camera;

moving an engageable portion of the closing mechanism, engaged with the film winder to cause rotation of the film winder in the winding direction to urge the film sensor against the filmstrip, out of engagement with the film winder and moving a non-engageable portion of the closing mechanism, which cannot be engaged with the film winder, against the film winder to prevent the engageable portion from becoming engaged with the film winder; and prewinding the filmstrip from the film cassette to form the unexposed film roll, which causes the coaxially engaged film winder and film spool to be rotated in an unwinding direction, whereby the engageable portion will be protected from becoming worn.

5. A method as recited in claim 4, wherein the closing mechanism is pivoted to move the engageable portion of the closing mechanism out of engagement with the film winder and to move the non-engageable portion of the closing mechanism against the film winder.

* * * * *